United States Patent [19]

Okamoto

[11] Patent Number: 5,775,995
[45] Date of Patent: *Jul. 7, 1998

[54] INTERACTIVE COMMUNICATION SYSTEM FOR COMMUNICATING VIDEO

[76] Inventor: Takeya Okamoto, c/o Adachi International, Nagoyaseni Bldg. 9-27, Nishiki 2-chome, Naka-ku, Nagoya-shi, Aichi-ken, Japan

[*] Notice: The term of this patent shall not extend beyond the expiration date of Pat. No. 5,735,744.

[21] Appl. No.: 642,560

[22] Filed: May 3, 1996

Related U.S. Application Data

[60] Division of Ser. No. 555,400, Nov. 9, 1995, and a continuation-in-part of Ser. No. 232,862, Apr. 25, 1994, Pat. No. 5,489,103.

[30] Foreign Application Priority Data

Apr. 25, 1994 [JP] Japan ................... 5-108303

[51] Int. Cl.$^6$ ................................... A63F 9/22
[52] U.S. Cl. ................................... 463/40
[58] Field of Search ................ 463/40, 41, 42; 364/410; 273/237; 434/307 A; 379/96, 93, 90; 395/916, 917; 455/6.3, 39, 66

[56] References Cited

U.S. PATENT DOCUMENTS

| | | |
|---|---|---|
| 5,018,736 | 5/1991 | Pearson et al. .................. 273/439 |
| 5,236,199 | 8/1993 | Thompson et al. .................. 273/439 |
| 5,250,747 | 10/1993 | Tsumura et al. .................. 434/307.4 |
| 5,273,286 | 12/1993 | Teshima et al. .................. 273/439 |

*Primary Examiner*—Jessica Harrison
*Assistant Examiner*—Michael O'Neill
*Attorney, Agent, or Firm*—Davis and Bujold

[57] ABSTRACT

An interactive communication system is proposed for communicating software of video games or karaoke music from a host facility or distributor to end users. The system includes a communication terminal device provided at the end user. The communication terminal device includes a computer and a device for performing interactive communication with the host facility. The communication terminal device also includes temporary storage device in which video game data or karaoke data received from the host facility is temporarily stored. Game data stored in the temporary storage device is automatically deleted after a predetermined time period. Instead of the data deletion, the system can block the view displayed on the screen of the terminal device when a predetermined time has elapsed. The game data can be transmitted from broadcasting station to the terminal device via broadcasting wave.

3 Claims, 11 Drawing Sheets

FIG.5

| X: DESIRED GAME NUMBER | ☐ ←315 |
| Y: EXPLANATION | ☐ ←317 |
| Z: PRINT | |

| GAME NUMBER | GAME NAME | NUMBER OF PLAYER | CHARGE |
|---|---|---|---|
| 1 | ···CART | 1-2 | ( ··· ) |
| 2 | ···PAINT | 1 | ( ··· ) |
| 3 | SUPER··· | 1-2 | ( ··· ) |
| 4 | ···LEGEND | 1-2 | ( ··· ) |
| 5 | STREET··· | 1-2 | ( ··· ) |

311
313

(1)

INTERACTIVE COMMUNICATION SYSTEM FOR COMMUNICATING VIDEO

This is a divisional application of Ser. No. 08/555,400, filed Nov. 9, 1995 still pending and a Continuation-in-Part of pplication Ser. No. 08/232,862 filed Apr. 25, 1994.

FIELD OF THE INVENTION

This invention relates to an interactive communication system for communicating software of video game and karaoke from a host facility to communication terminal devices.

BACKGROUND OF THE INVENTION

Video games have become very popular family entertainment. In order to play a video game, a game cassette is first installed in a video game machine body. Game data, contained in the cassette and including video information or video plus audio information, is read out and output to a common television receiver. Accordingly, the one who wishes to play a video game must have a video game machine and a game cassette, besides his television set. Once he installed the game cassette containing the game he chose to play, he can play the game whenever and as many times as he wishes.

However, there lies a problem: the player has to purchase each and every game cassette he wishes to play, which is very costly. For all the advantage that the player can play the game repeatedly, he may soon get tired of the game, or the game content may not be oriented for repeated play.

Another entertainment increasing in popularity is "karaoke", i.e. singing to recorded instrumental accompaniment. More and more "karaoke bars" can be seen in major cities, and karaoke apparatus for domestic use are also widely accepted. Such a family karaoke apparatus needs, by definition, karaoke music software among various forms of software available in the marketplace, such as video disk and video tape containing video plus audio information, or music tape containing only audio information. The karaoke singers, tempted by changes in the update music trend, tend to purchase newly available karaoke data one after another. There arise problems of accumulated expenditure and limited storage space for the increasing software.

SUMMARY OF THE INVENTION

Wherefore, an object of this invention is to provide an interactive communication system in which software of video game and karaoke are communicated via communication lines from a host facility to calling communication terminal devices at each individual home.

In order to attain the stated object, a communication terminal device according to the present invention includes communication means connected to communication lines, for sending out or receiving data, and computer for outputting control instructions to the communication means, and outputting or inputting data to or from the communication lines via the communication means. The communication terminal device further includes temporary storage means for temporarily storing the data inputted from the communication lines if the data inputted is game data including video information or video plus audio information, and game data outputting means included in the computer, for outputting, if the data stored in the temporary storage means is game data, the game data to integral or external display means, and, if the game data also includes audio information, to integral or external sound generating means.

In this way, the computer controls the communication means by supplying control instructions thereto. Data is thus sent out, under the control by the computer, via the communication means and the communication lines, or received via the communication lines and the communication means.

When the data input from the communication lines is a game data, the temporary storage means temporarily stores the game data, which is then output by the game data outputting means to display means. The display means may be provided on the communication terminal device or provided externally. If the game data also includes audio information, the game data is also output to sound generating means. The sound generating means may also be provided on the communication terminal device or provided externally.

From another aspect of the invention, the computer includes print data outputting means to output print data to printing means provided on the computer or provided externally. Thereby, the data stored in the computer can be printed out by the printing means. For example, when the player wishes to quit the play, the current status of the game progress, e. g. which player corresponds to which character in the game, or the top scorer at the time, can be stored. When resuming the game, the player can refer to the printed data.

From still another aspect of the invention, a communication system according to the present invention includes the above described communication terminal device and a host facility intercommunicably connected to the communication terminal device. When the communication terminal device requests the host facility to provide a game data, the host facility sends out the corresponding game data to the communication terminal device via the communication lines. The game data, received at the communication terminal device, is temporarily stored in the temporary storage means.

From a further aspect of the invention, the game data stored in the temporary storage means is deleted in a predetermined time period after the game data was received at the communication terminal device. In order to effect this deletion, the communication terminal device may include control means which operates, responsive to receipt of the game data, to delete the game data after a predetermined time period. Alternatively, the host facility may send an instruction concerning the time period, in-addition to each game data it sends out. The latter alternative permits alteration of the time period with respect to each game.

By utilizing the communication system, the player need not purchase a game cassette or other software for playing video games, since the game data is provided by the host facility which received the game data request sent by the player from his communication terminal device. Further, the game data provided to the player is temporarily stored in the temporary storage means of the communication terminal device, thereby releasing the host facility to serve other communication terminal device requesting game data. The host facility is thus enabled to respond to a greater number of callers having communication terminal devices.

Furthermore, the game data stored in the temporary storage means is deleted in a predetermined time period after it was received at the communication terminal device. In other words, the useful life of the game data at the communication terminal devices is limited. As a result of this arrangement, in order to continue the game play at the end of the predetermined time period, the player again needs to request the game data to the host facility. This arrangement is therefore prerequisite so long as the game data transmission service is not free of charge. In contrast, if it were possible to down-load the game data to the communication terminal device at the end of the player, he could play the game permanently without calling the host facility. Consequently, the service cost per each transmission would be higher than the normal price of the game cassettes. The above described arrangement solves this problem and meets the need of software distributor.

The arrangement is also beneficial to the players since the service cost per each transmission can be considerably lower than the price of each game cassette. Therefore, the game player who conventionally has to buy an expensive game cassette, even if he plays the game only once, can be satisfied with the reasonable cost of the transmission.

The arrangement proves its superiority also in respect of child discipline. Video game players are in most cases younger children, who often become too much absorbed in playing video games to quit in the middle thereof. The above arrangement according to the present invention leaves these children no other choices but to quit the play when a predetermined time period has elapsed. Thus, the arrangement meets the rising demand of the parents.

From still another aspect of the invention, a communication terminal device according to the present invention includes communication means connected to communication lines, for sending out or receiving data, and computer for outputting control instructions to the communication means, and outputting or inputting data to data to or from the communication lines via the communication means. The communication terminal device further includes temporary storage means for temporarily storing the data inputted from the communication lines if the data inputted is karaoke data including video information or video plus audio information, and karaoke data outputting means included in the computer, for outputting, if the data stored in the temporary storage means is karaoke data, the karaoke data to integral or external sound generating means, and, if the karaoke data also includes video information, to integral or external display means.

When the data input from the communication lines is a karaoke data, the temporary storage means temporarily stores the karaoke data, which is then output by the karaoke data outputting means to sound generating means. The sound generating means may be provided on the communication terminal device or provided externally. If the karaoke data also includes video information, the karaoke data is also output to display means. The display means may also be provided on the communication terminal device or provided externally.

From still further aspect of the invention, a communication system according to the present invention includes the above described communication terminal device and a host facility intercommunicably connected to the communication terminal device. When the communication terminal device requests the host facility to provide a karaoke data, the host facility sends out the corresponding karaoke data to the communication terminal device via the communication lines. The karaoke data, received at the communication terminal device, is stored in the temporary storage means.

By utilizing the communication system, the karaoke singer need not purchase a video disk or other karaoke data software, since the karaoke data is provided by the host facility which received the karaoke data request sent by the singer from his communication terminal device. Further, the karaoke data provided to the singer is temporarily stored in the temporary storage means of the communication terminal device, thereby releasing the host facility to serve other communication terminal device requesting karaoke data. The host facility is thus enabled to respond to a greater number of callers having communication terminal devices.

Other objects, advantages and novel features of the invention will become apparent from the following detailed description of the invention when considered in conjunction with the accompanying drawings, in which like reference characters designate the same or similar parts through the figures thereof.

BRIEF DESCRIPTION OF THE DRAWINGS

FIG. 5 is an example of screen display in accordance with the method of further operation selection in the embodiment;

DETAILED DESCRIPTION OF THE PREFERRED EMBODIMENT

Figure 2:
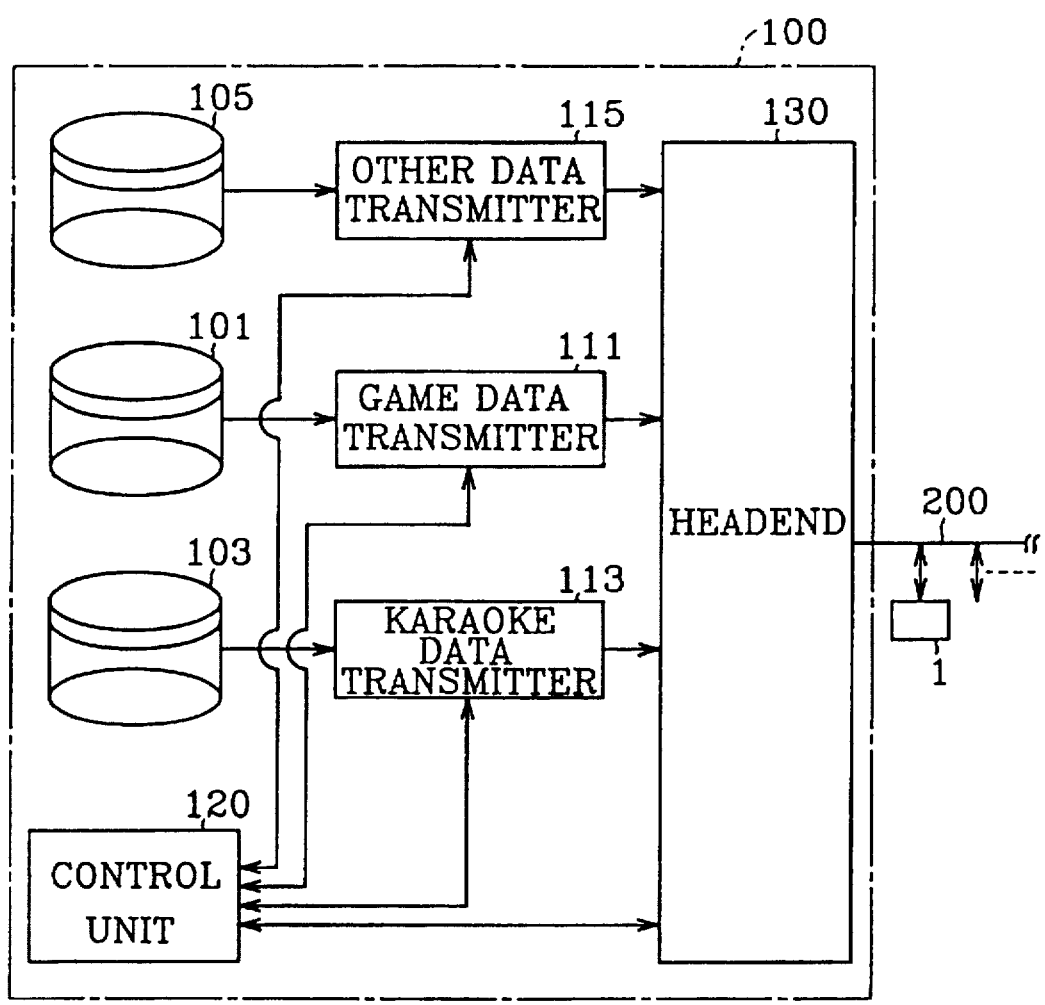
FIG. 2 is a block diagram of a communication system including the communication terminal device shown in FIG. 1.

As shown in FIG. 2, the communication system according to the present invention includes a host facility 100, a personal communicator 1 as communication terminal device, and transmission paths 200 as communication lines.

The host facility 100 has game data base 101, karaoke data base 103 and other data base 105. The host facility 100 also has game data transmitter 111, karaoke data transmitter 113 and other data transmitter 115 to retrieve data from corresponding data base and transmit them. The host facility 100 further has control unit 120 to control the transmitters 111, 113 and 115, and a headend 130 to output or input signals.

When a request data is sent out from the personal communicator 1 via the transmission paths 200, the request data is received through the headend 130 and input by the control unit 120. The control unit 120 then controls one of the transmitters 111, 113 and 115 to retrieve data corresponding to the request, and the retrieved data is sent out via the headend 130 to the transmission paths 200.

The transmission paths 200 is coaxial cables and connected to a plurality of personal communicators 1.

Figure 1:
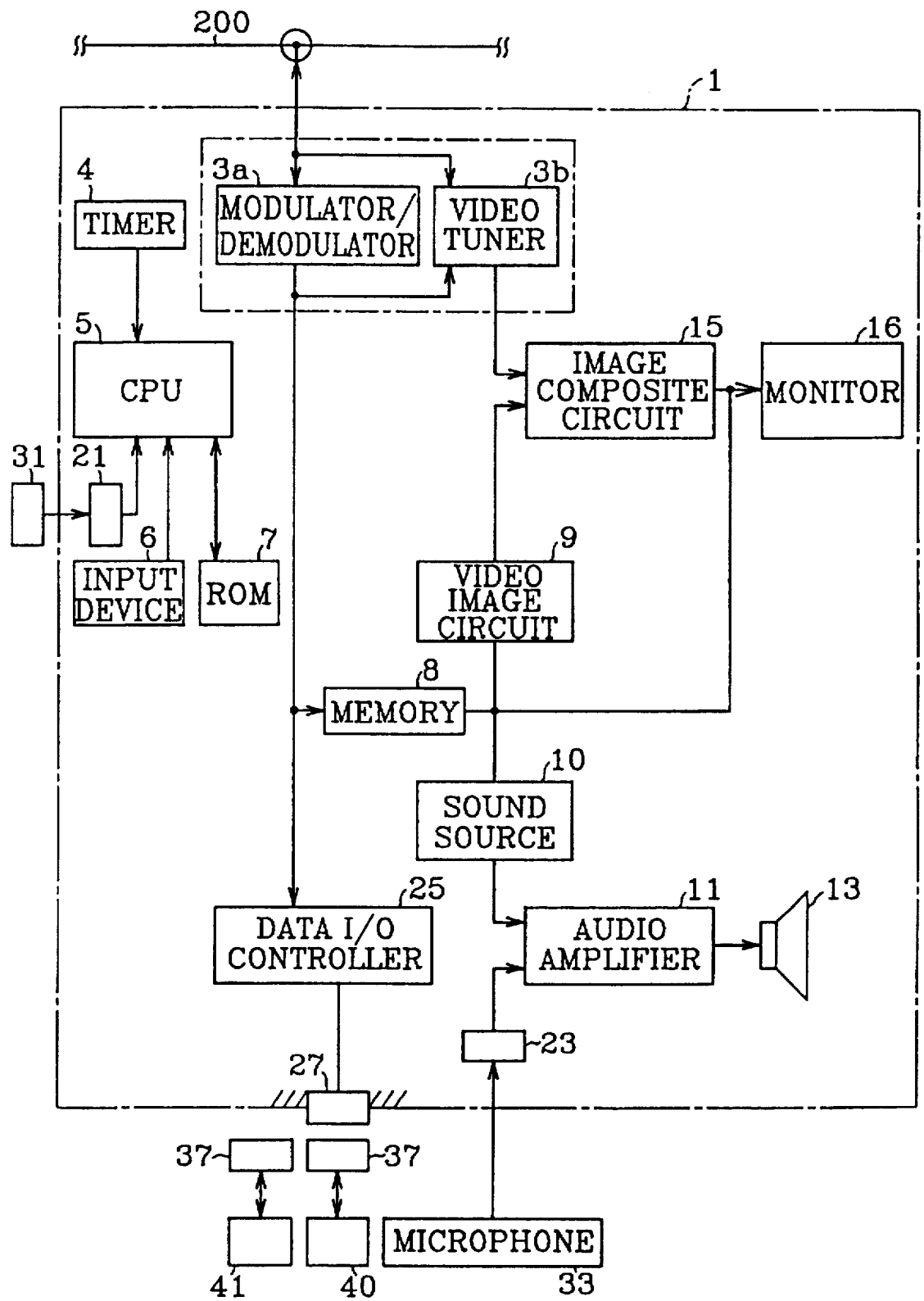
FIG. 1 is a block diagram of a communication terminal device according to the present invention.

As shown in FIG. 1, the personal communicator 1 includes a terminal modem 3, timer 4, CPU 5, input device 6, ROM 7, memory 8, video image circuit 9, sound source 10, audio amplifier 11, speaker 13, image composite circuit 15, monitor 16, controller connector 21, microphone connector 23, data input/output controller 25 and data input/output connector 27.

The terminal modem 3 is connected to the transmission paths 200 and includes modulator/demodulator 3a and video tuner 3b which selects a channel of the image to be projected.

The input device 6 may be a keyboard or mouse, and is used for inputting designation of a desired game or karaoke data or other instructions. When a controller 31, which is for exclusive use for playing video games, is connected to the controller connector 21, the controller 31 can be operated only for playing game. The controller 31 is provided with joy sticks or other control buttons commonly provided on conventional video game machines.

By connecting a microphone 33 to the microphone connector 23, the user can have his voice output from the speaker 13.

The data input/output connector 27 is connected via data output cable 37 to a printer 40, personal computer 41, or other apparatus.

Figure 3:
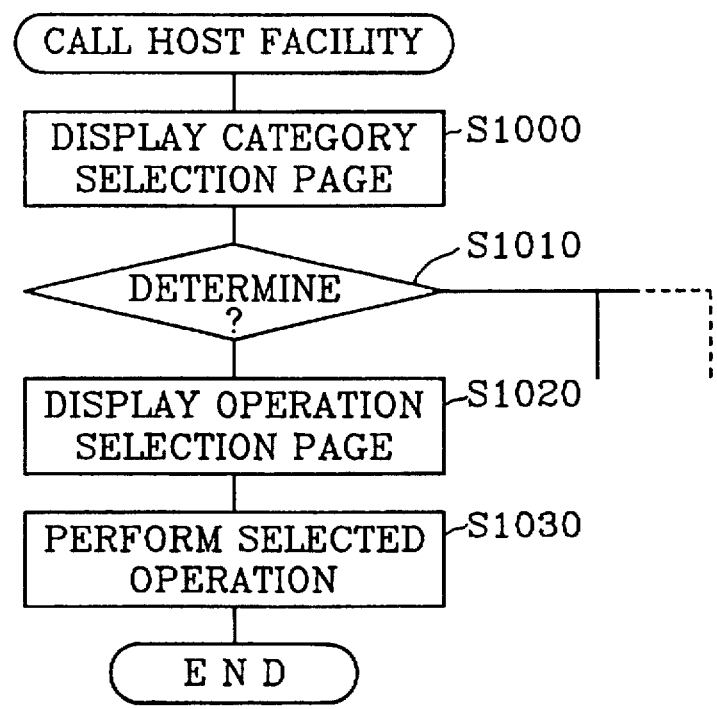
FIG. 3 is a flowchart of the process to call a host facility.

The operation effected on the CPU 5 will be now explained referring to the flowchart of FIG. 3.

When power is supplied, a main menu is displayed, among which "call host facility" is selected.

First, category selection page are displayed at step S1000. The display includes the instruction of "select a category" and a list of available categories such as game and karaoke. Selected category is next determined at step S1010. Subsequently, operation selection page corresponding to the selected category is displayed at step S1020. The display of the operation selection page includes an instruction to the operator and the list of available operations in the selected category. When the operator inputs his direction responsive to this instruction, corresponding respective operation process is performed at step S1030. In preparation for the respective operation process, the personal communicator 1 is connected to the host facility 100 such that the interactive communication can be performed between the personal communicator 1 and the host facility 100.

The above procedure is further explained in detail, only for exemplification purpose, hereinafter referring to FIGS. 4, 5 and 6.

Figure 4:
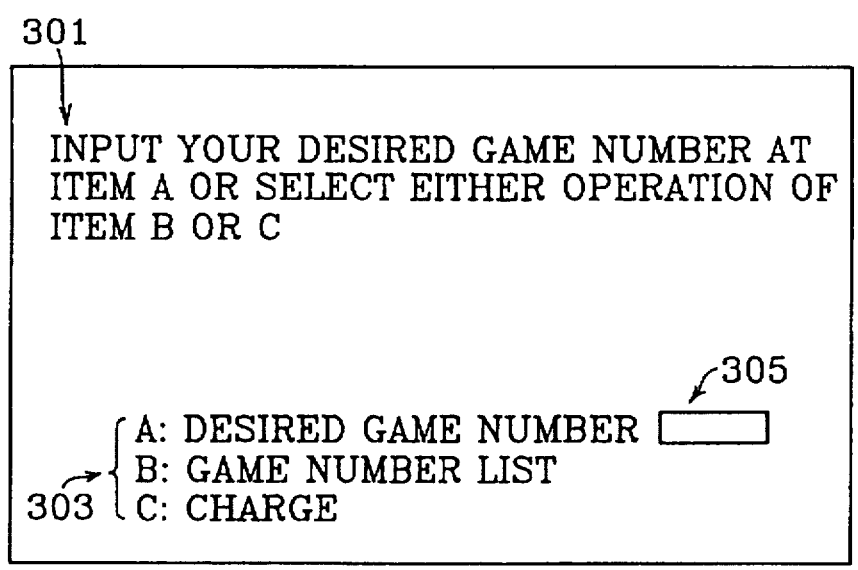
FIG. 4 is an example of screen display in accordance with the method of operation selection in the embodiment.

When "game" category is selected at step S1000, operation selection page shown in FIG. 4 is displayed, with an instruction 301 and operation list 303 shown on the screen. The operation list has three items of item A, item B and item C. The item A has a first game number box 305, into which the operator can directly input a game number representative of a specific game to receive his desired game data. The item B is the operation to display the list of the game numbers now available from the game data base 101 of the host facility 100. The item C is the operation to display charges, for example the accumulated cost for the month or the past month(s).

When the operator wishes to play game, the item A or B is to be selected. For example, if the operators knows the game number of the game he wishes to play, the operator moves the cursor on the screen to the first game number input box 305, and inputs his desired game number therein. If the operator does not know the game number, he selects the item B.

When the item B is selected, data concerning the list of game numbers are sent from the host facility 100 and displayed on the screen. As shown in the FIG. 5, the list displayed by selecting the item B has an input part 311 and display part 313. The display of the game list 313 can be scrolled to display further list of games. The display part 313 displays the number of players able to participate in the play and the charge, in addition to the game numbers and the game name. The operator, referring to these information on the screen, inputs his desired game number into a second game number input box 315 of the input part 311.

When selecting a game for the first time, the operator may wish to know the feature or outline of the game. In this case, the operator inputs the selected game number into an explanation box 317 of the item Y of the input part 311. As a result, the outline of the game is explained on the display part 313.

The game list can be printed out such that the operator can refer to the printed game list when he selects a game in other occasion. For printing, the item Z of "print" in the input part 311 is to be selected. In response, the game list is printed, via the data input/output connector 27 and data output cable 37 shown in FIG. 1, at the printer 40.

Figure 6:
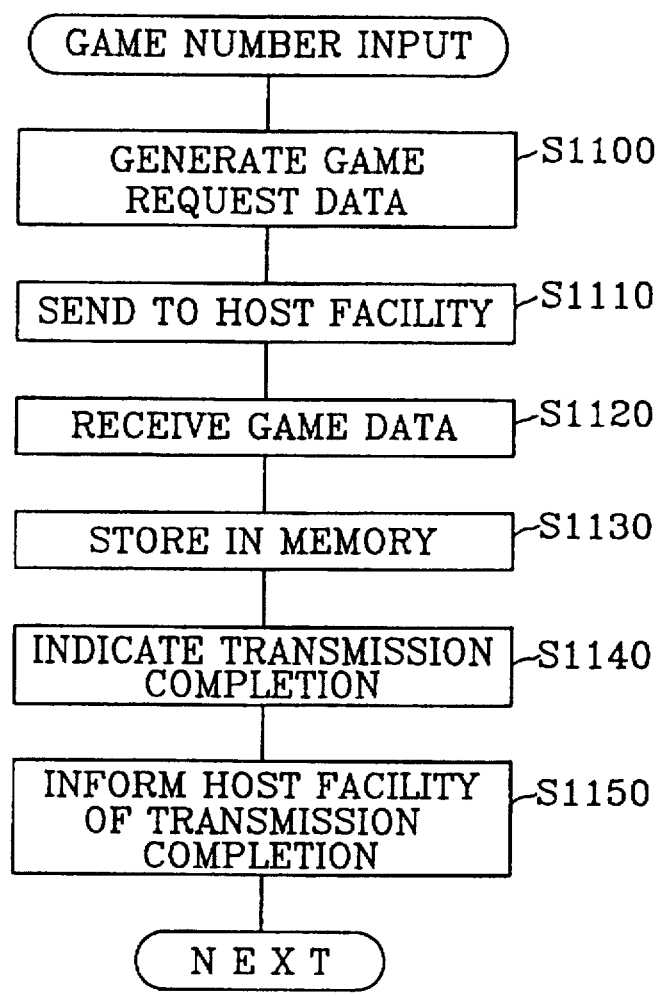
FIG. 6 is a flowchart of the process to be effected when playing a game is requested at the communication terminal device.

The process which is effected when a game number is input in the first game number box 305 of the item A shown in FIG. 4 or in the second game number box 315 of the item X shown in FIG. 5 will be now explained referring to FIG. 6.

First, game request data is generated at step S1100. The game request data includes the identification number of the calling personal communicator 1 and the desired game number. The generated game request data is then sent out to the host facility 100 at step S1110.

At the host facility 100, the received request data is input by the control unit 120 through the headend 130. Subsequently, game data corresponding to the request is retrieved from the game data base 101 by the game data transmitter 111. The retrieved game data is sent out via the headend 130 to the transmission paths 200 and to the corresponding personal communicator 1. First and second predetermined time periods, which will be described later in detail, are also sent out to the personal communicator 1.

Turning back to FIG. 6, the game data is received at the personal communicator 1 at step S1120 and stored in the memory 8 at step S1130. When the storage of the game data into the memory 8 is completed, the completion is indicated on the monitor 16 at step S1140. Further, data indicative of the completion of the game data transmission is sent out to the host facility 100 at step S1150 as the last step of the instant process step, and the personal communicator 1 awaits next operation. When, for example, game play is instructed by the next operation, the game stored in the memory 8 is started.

Figure 7:
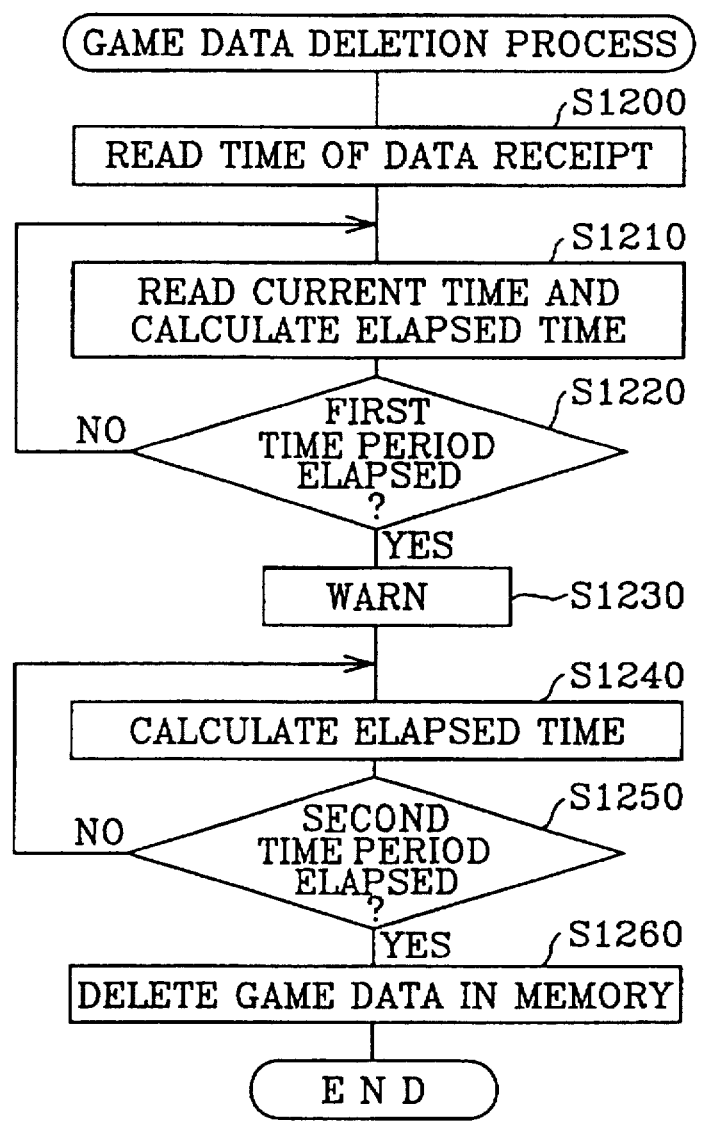
FIG. 7 is a flowchart of the process to effect deletion of the game data.

The game data stored in the memory 8 is automatically deleted, as shown in the flowchart of FIG. 7, in the following manner.

The game data received by the process shown in FIG. 6 is deleted, as shown in FIG. 7, in the following manner. First, the time when the data receipt is completed is read out at step S1200. The current time is also read out and the time period which has elapsed after the completion of the data receipt is calculated at step S1210. Next, it is determined, at step S1220, whether or not a first predetermined time period has elapsed. If "NO" is determined at the step S1220, the flow goes back to the step S1210. Thus, when the first predetermined time period has elapsed, a warning is given at step S1230. Further elapsing time period is calculated at step S1240. When it is determined, at step S1250, that a second predetermined time period has elapsed, the game data stored in the memory 8 is deleted at step S1260, and the instant process ends.

The warning given at step S1230 may be a various form of warning, such as a message reading "Time Out in Five Minutes!" on the monitor 16, or alarming sound. Therefore, the addition of the first predetermined time period of the step S1220 and the second predetermined time period of the step S1250 is the useful life period of the received game data. The warning may be provided a plurality of times, such as five minutes, two minutes and one minute before the deletion of the game data. Warned by this warning, the player can print the current status of the game progress, for example which player corresponds to which character in the game or the top scorer at the time, at the printer 40 before quitting the game play. The printed data is useful when the player resumes the game play.

Furthermore, when the host facility 100 receives the data indicative of the transmission completion at the step S1150, the host facility 100 performs the charging process to accumulate the cost for its data transmission service. There are known two systems to charge the cost. One is the fixed amount system and the other is the pay-per-play system. In the fixed amount system, the fixed amount cost, for example monthly, is predetermined. In the pay-per-play system, the cost is charged per each play.

The charging system is dependent on the form or condition of the communication service to be rendered. In practical charging system, the cost would be varied with respect to the complicatedness or scale of the game data provided. The cost would be also varied depending on whether the game is new or old in the market. In the present embodiment, the pay-per-play system is adopted and the cost for the data service to each terminal communicator is charged every time the data indicative of the transmission completion is sent from the personal communicator 1 at the step S1150. The payment would be made, using the automatic transfer system, by debiting the amount to the bank account of the players.

However, the pay-per-play system has a problem: the player cannot know the total amount of the accumulated cost before actual payment. If the payment is made using the automatic transfer system, the player may not even notice his considerable expenditure on the game play. This problem is solved by the arrangement shown in FIG. 4. If the player selects the item C of the operation list 303, the present accumulated cost and the previous cost, such as the payment made previously or the cost accumulated in the past half or whole year, are shown on the screen. Thus, the parents can know the accumulated cost for their child's video game play.

By utilizing the communication system, the player need not purchase a game cassette or other software for playing video games, since the game data is provided by the host facility which received the game data request sent by the player from his personal communicator 1. Further, the game data provided to the player is temporarily stored in the memory 8 serving as temporary storage means of the personal communicator 1, thereby releasing the host facility to serve other personal communicators 1 requesting game data. The host facility is thus enabled to respond to a greater number of callers having personal communicators 1.

Furthermore, the game data stored in the memory 8 is deleted in a predetermined time period after it was received at the personal communication 1. In other words, the useful life of the game data at the personal communicator 1 is limited. As a result of this arrangement, in order to continue the game play at the end of the predetermined time period, the player again needs to request the game data to the host facility 100. This arrangement is therefore prerequisite so long as the game data transmission service is not free of charge. In contrast, if it were possible to down-load the game data to the communication terminal device at the end of the player, he could play the game permanently without calling the host facility 100. Consequently, the service cost per each transmission would be higher than the normal price of the game cassettes. The above described arrangement solves this problem and meets the need of the software distributors.

The arrangement is also beneficial to the players since the service cost per each transmission can be considerably lower than the price of each game cassette. Therefore, the player who conventionally has to buy an expensive game cassette, even if he plays the game only once, can be satisfied with the reasonable cost of the transmission.

The arrangement proves its superiority also in respect of child discipline. Video game players are in most cases younger children, who often become too much absorbed in playing video games to quit in the middle thereof. The above arrangement according to the present invention leaves these children no other choices but to quit the play when a predetermined time period has elapsed. Thus, the arrangement meets the rising demand of the parents.

The above embodiment is explained on the premise that the game is played by a single player using only a single personal communicator 1. However, a plurality of players in remote places can play the same game together.

For example, the transmission paths 200 or telecommunication lines is utilized to connect a plurality of personal communicators 1 to one another such that the interactive communication can be performed therebetween. When the plurality of personal communicators 1 are supplied with the same game data, the players have the same game characters in common. Therefore, the data to be transmitted among the plurality of personal communicators 1 are only character number data and the position data. Thus, the players together participate, on a real time basis, in the same game on the monitor 16 of respective personal communicator 1.

Map data of a role-playing game may be divided according to the progress degree of the story and the divided map data be sold separately. When the game progresses and the player wishes to play on a more advanced map data, the player is to purchase and download the advanced map data. In this case, arrangement is provided such that the player cannot purchase the advanced map data until the "capacity" or the progress degree of the characters in the game reaches a predetermined degree or level. Accordingly, using the interactive communication system, the player is to ask the host facility 100 for the proof of the capacity. In response, data proving the capacity or level of the characters may be transmitted from the host facility 100. The capacity proof sent from the host facility 100 would be printed out by the printer 40 or transmitted to the player's facsimile machine, as a certificate.

It will be now explained how the communication system of the present invention is adopted to karaoke. The procedure to communicate the karaoke data is basically similar to the above described procedure to communicate the game data. There fore, the explanation of the similar portion of the procedure are omitted for simplification. When using the system for karaoke, the microphone 33 is connected to the microphone connector 23 of the personal communicator 1.

When "karaoke" is selected on the category selection page at step S1000, an operation selection page similar to that of FIG. 4 is displayed on the screen. Specifically, an item A of a desired karaoke number, item B of the karaoke number list, and item C of charge are displayed. If the operator wishes to start karaoke, the operator is to input his desired karaoke number in the corresponding box at the item A or B.

Karaoke request data is then generated at the personal communicator 1 and sent out to the host facility 100. The host facility 100, receiving the request, controls the karaoke data transmitter 113 to retrieve a corresponding karaoke data from the karaoke data base 103, and sends out the retrieved karaoke data to the personal communicator 1.

The karaoke data received at the personal communicator 1 is stored, as song data, in the memory 8 via the modulator/demodulator 3a. At the same time, the CPU 5 sends song selection data, which is predetermined according to the type of each song, to the video tuner 3b in order to select visual data suitable to the selected song. Further, the CPU 5 synchronously outputs to the video image circuit 9 and the sound source 10, respectively, words data and accompaniment data included in the song data stored in the memory 8. The video image circuit 9 converts the information concerning the words and other element of the song into word/image data and outputs the word/image data to the monitor 16.

The sound source 10 converts the accompaniment data into audio signals, and outputs the audio signals to the audio amplifier 11. Subsequently, the audio amplifier 11 synthesizes the audio signals and the voice signals sent from the microphone 12, amplifies these synthesized signals and outputs to the speaker 13 as sound signals. On the other hand, the video tuner 3b reads out background visual data selected according to the song selection data, and outputs to the image composite circuit 15. Then, the image composite circuit 15 synthesizes the background visual data and the words/image data and outputs the video signals to the monitor 16.

The procedure for playing karaoke music will be further explained in detail.

The song data sent out from the host facility 100 via the co-axial cables as transmission paths 200 includes multiplied RF signals of video information and RF signals converted from the song data. Th e CPU 5 of the personal communicator 1 sends the song selection data to the video tuner 3b of the terminal modem 3 in order to select the video channel according t o the received song data. The song selection data is p redetermined according to the genre of songs. Consequently, the song data is sent to the sound source 10 and the karaoke music is played.

When the karaoke music is ended, data indicative of the end of the play is sent to the host facility 100. In response, the host facility 100 performs the charging process. In contrast to the pay-per-play system of the game data service, the cost for providing the karaoke music may be charged, for example per hour, since a single karaoke music is only a several minutes long. Further, the automatic deletion process as in the transmission of the game data is not necessary in the case of sending the karaoke data. Instead, when the present system is used for communicating karaoke data, the memory 8 also functions as retaining means for retaining the karaoke data stored in the temporary storage means so long as the power is supplied to the personal communicator 1.

By utilizing the communication system, the karaoke singer need not purchase a video disk or other karaoke software, since the karaoke data is provided by the host facility 100 which received the karaoke data request sent by the karaoke singer from his personal communicator 1. Further, the karaoke data provided to the karaoke singer is temporarily stored in the memory 8 serving as temporary storage means of the personal communicator 1, thereby releasing the host facility 100 to serve other personal communicators 1 requesting karaoke data. The host facility 100 is thus enabled to respond to a greater number of callers having personal communicators 1.

This invention has been described above with reference to the preferred embodiment as shown in the drawings. Modifications and alterations may become apparent to one who skilled in the art upon reading and understanding the specification. Despite the use of the embodiment for illustration purposes, it is intended to include all such modifications and alterations within the scope and spirit of the appended claims.

In this spirit, it should also be noted that in the embodiment, the personal communicator 1 is integrally provided with the monitor 16 and the speaker 13. However, any other external monitor or speaker may be connected to the personal communicator 1 and utilized. For example, a television receiver may be connected to the personal communicator 1, thereby outputting the video information and the audio information on the television receiver. In this case, the personal communicator 1 may be provided with a small display, on which the selection pages as those shown in FIG. 4 and 5 would be displayed.

Furthermore, the transmission paths 200 may be existing co-axial cables for cable television system, thereby structuring the communication system of the present invention as a multimedia interactive communication system. In this way, video and audio information of satellite television service, video disk, radio program, and other various form of available software are equated to the other data base shown in FIG. 2. Such personal communicators 1 of the present invention can be provided in each individual's home or hotel room and other various situations and places.

By utilizing the communication system, the user need not purchase a game or karaoke software, since the game or karaoke software is provided by the host facility 100 which received the data request sent by the user from his personal communicator 1. Further, the data provided to the user is temporarily stored in the memory 8 serving as temporary storage means of the personal communicator 1, thereby releasing the host facility 100 to serve other personal communicators 1 requesting data. The host facility 100 is thus enabled to respond to a greater number of callers having personal communicators 1.

Furthermore, if the data stored is game data, that game data is deleted in a predetermined time period after it was received. This arrangement is beneficial to the data distributors since the repeated game play using the same game data provided only once is prevented.

Figure 8A:
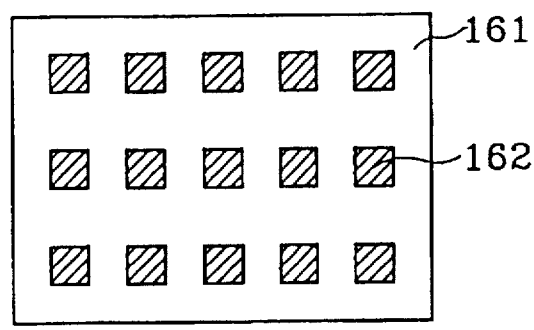
FIGS. 8A through 8D are illustrations showing various forms of modified interference means which interfere with the progress of game.
Figure 8B:
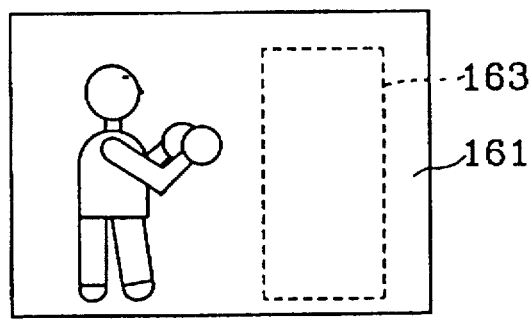
Figure 8C:
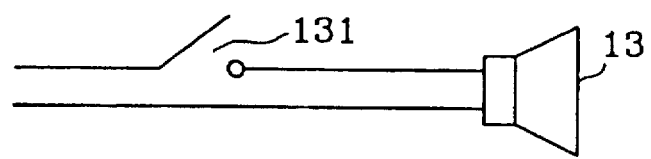
Figure 8D:
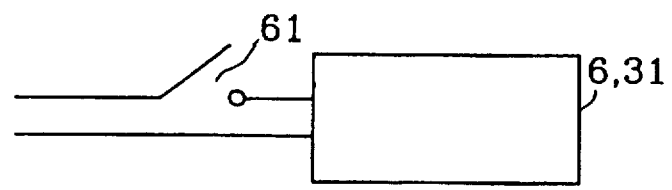

In the above described embodiment, the game data stored in the memory 8 is deleted in order to interfere with the progress of game. Alternative arrangements to this are provided by the present invention, as shown in FIGS. 8A through 8D. In the arrangement of FIG. 8A, the view on a screen 161 of the monitor 16 is blocked with patterns of stripes 162 displayed thereon. Instead, the view displayed on the screen may be partly deleted. In the arrangement shown in FIG. 8B, only an opponent of boxing game, who is to be displayed on an area 163 of the screen 161, is deleted. Still another alternative is provision of a switch 131 shown in FIG. 8C for a speaker circuit, which, when turned off, withholds the sound that would otherwise be issued from the speaker 13 during the game. Further alternative is provision of a switch 61 shown in FIG. 8D which invalidates the operation on the input device 6 or the controller 31. The switches 131 and 61 may be mechanical components or may be software operation. For instance, actuation of the sound source 10 may be halted by the CPU 5, or the CPU 5 may reject signals from the input device 6 or the controller 31. As still further alternative, the power of the personal communicator may be turned off when the CPU 5 determines that a predetermined time has elapsed after the game data was received.

Figure 9:
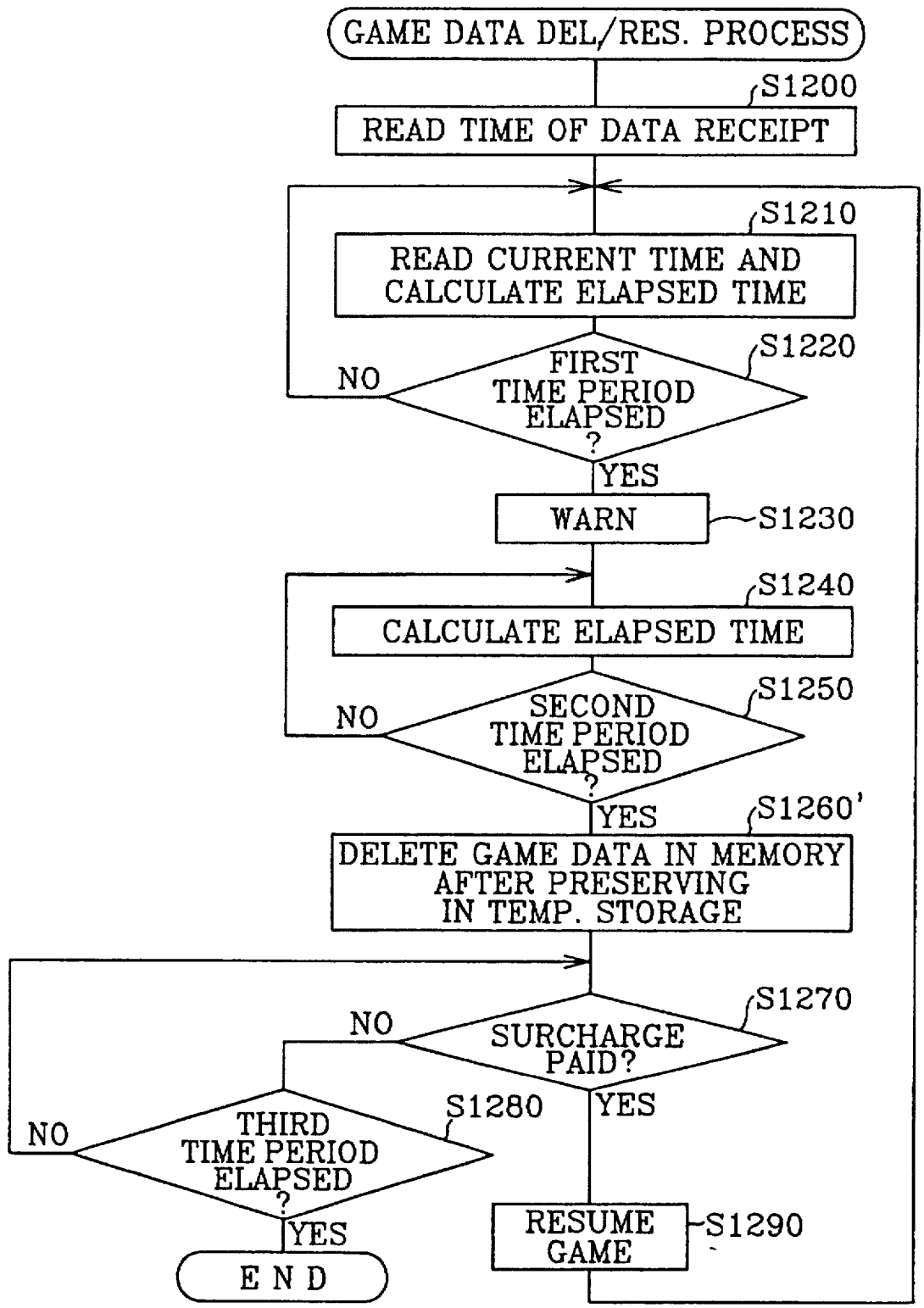
FIG. 9 is a flowchart of the game data deletion/restoration process.

In the described embodiment, when a predetermined time has passed after the game data was received from the host facility 100, the game data stored in the memory 8 is deleted. In this case, it may be arranged so that the player can resume playing the game by paying a surcharge. Specifically, the process steps shown in FIG. 9 may be taken. As will be noted, the process steps S1200 through S1250 in FIG. 9 are identical to those in FIG. 7, whereas at step S1260' the deletion of the game data is effected only after it is stored in a temporary storage device, different from the process at step S1260. At next step S1270, it is determined whether or not a surcharge is paid. If the answer to the step S1270 is given negative, it is next determined, at step S1280, whether or not a predetermined time has elapsed after the game data in the memory 8 was deleted. If the answer to the step S1280 is given negative, the flow returns to step S1270. If the answer to the step S1280 is given affirmative, the process step ends.

If "YES" is determined at the step S1270, the game data stored in the temporary storage device is restored into the memory 8 to permit resumption of game play, at step S1290. The flow then goes back to step S1210.

The arrangement shown in FIG. 9 allows a player to continue playing game as long as the player pays a surcharge. An instruction to pay the surcharge can be given through the keys on the input device 6. In response, the host facility 100 effects the charging process against the player.

Figure 10:
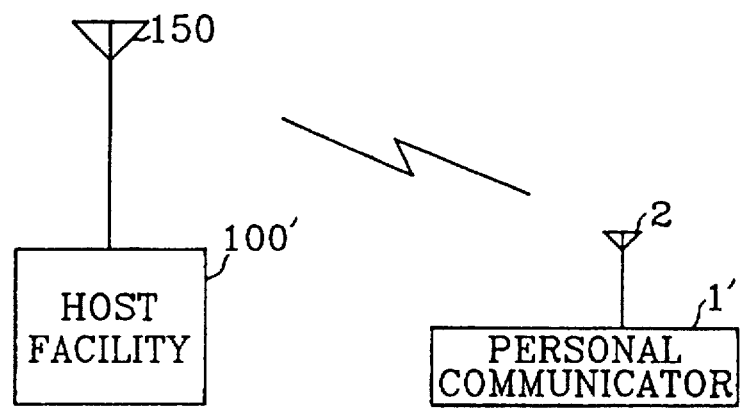
FIG. 10 is a block diagram schematically showing the system consisting of a host facility and the communication terminal device for receiving the game data from the host facility via wireless transmission.

In the embodiment shown in FIGS. 1 and 2, game data and karaoke data are transmitted via communication lines. Alternatively, as shown in FIG. 10, the data may be sent via wireless transmission from a host facility 100' to a personal communicator 1'. In this case, the host facility 100' is provided with a not-shown wireless transmission circuit including a transmitting/receiving antenna 150, and the personal communicator 1' is provided with a not-shown transmitter/receiver circuit including a transmitting/receiving antenna 2.

Figure 11:
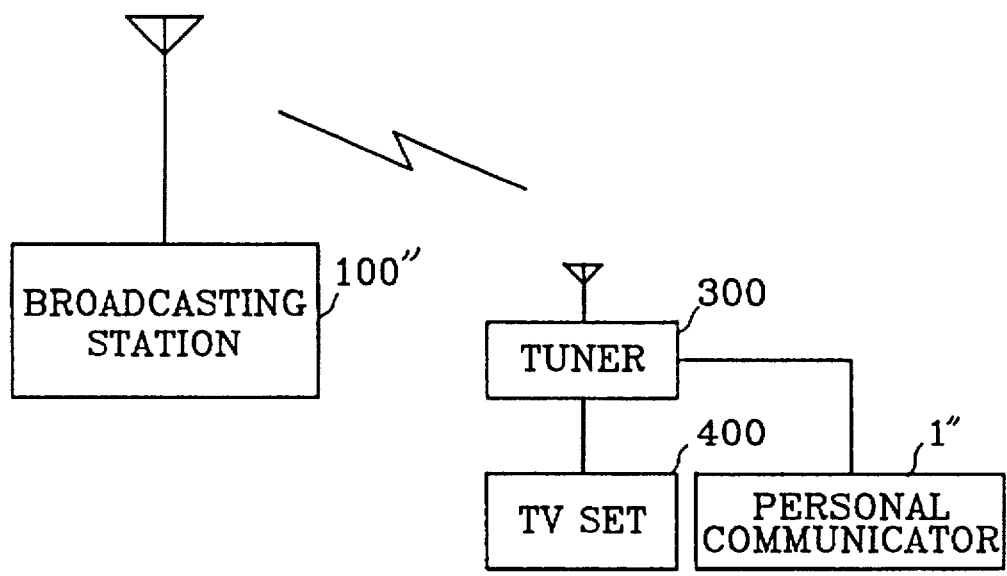
FIG. 11 is a block diagram schematically showing the system consisting of a broadcasting station and the communication terminal device for receiving the game data from the broadcasting station.

Turning to FIG. 11, a further modification is proposed in which the game data is sent from a ground broadcasting station 100" or a satellite broadcasting station. The game data, as it is received, is stored in the memory 8 of the personal communicator 1". In this case, the personal communicator 1" is connected with a tuner 300 so that the game is displayed on a wide screen of home TV set 400.

In both modifications shown in FIGS. 10 and 11, the game play is interfered with when a predetermined time has elapsed after the game data was received at the personal communicators 1', 1". Of course, the arrangement shown in FIG. 9 may be incorporated into these arrangements of FIGS. 10 and 11 to allow the player to continue playing game by paying a surcharge.

Wherefore, having described the present invention, what is claimed is:

1. A communication system having a host facility and communication terminal device capable of communicating with said host facility, said communication terminal device comprising:

an input device for inputting instructions to process data, receiving means for receiving software program as sent out from said host facility, software program storage means for storing the software program received by said receiving means, executing, means for executing data processing by using the software program stored in said software program storage means, in accordance with instructions from said input device, display means having a screen for displaying the progress of data processing by said executing means, clock means for keeping a predetermined time period after said receiving means received the software program, and interference means for interfering with the execution of said executing means by blocking the view on the screen on which the progress of data processing is displayed by display means when said clock means counts said predetermined time period, said host facility comprising:

software program file storage for storing software program as well as duration data indicative of the predetermined time period to be counted by said clock means, and sending out means for sending out the software program and the duration data stored in said software program file storage to said communication terminal device.

2. The communication system according to claim 1, said communication terminal device further comprising:

second clock means for keeping a predetermined second time period after said receiving means of said communication terminal device received software program, said predetermined second time period being shorter that said predetermined time period counted by said clock means, and alarm means for issuing an alarm when said second clock means counts said predetermined second time period, and thereby informing that the time of interference by said interference means with the effecting of said effecting means will soon be performed.

3. The communication system according to claim 2, further comprising:

third clock means for keeping a predetermined third time period after said interference means interfered with the effecting of said effecting means, interference stop instruction means for instructing to stop the interference performed by said interference means, and means for stopping the interference performed by said interference means and thereby allowing resumption of effecting of data processing performed by said effecting means when the interference stop instruction means received the instruction before said third clock means counts said third time period.

* * * * *

(12) EX PARTE REEXAMINATION CERTIFICATE (8977th)
United States Patent
Okamoto

(10) Number: US 5,775,995 C1
(45) Certificate Issued: Apr. 24, 2012

(54) INTERACTIVE COMMUNICATION SYSTEM FOR COMMUNICATING VIDEO

(76) Inventor: Takeya Okamoto, Nagoya (JP)

Reexamination Request:
No. 90/009,523, Aug. 17, 2009
No. 90/010,663, Sep. 2, 2009

Reexamination Certificate for:
Patent No.: 5,775,995
Issued: Jul. 7, 1998
Appl. No.: 08/642,560
Filed: May 3, 1996

Related U.S. Application Data

(60) Division of application No. 08/555,400, filed on Nov. 9, 1995, now Pat. No. 5,735,744, and a continuation-in-part of application No. 08/232,862, filed on Apr. 25, 1994, now Pat. No. 5,489,103.

(30) Foreign Application Priority Data

Apr. 25, 1994 (JP) ................................. 5-108303

(51) Int. Cl.
*A63F 13/12* (2006.01)
*G10H 1/36* (2006.01)
*G06F 19/00* (2006.01)

(52) U.S. Cl. ........................................ 463/40

(58) Field of Classification Search ........................ None
See application file for complete search history.

(56) References Cited

To view the complete listing of prior art documents cited during the proceeding for Reexamination Control Number 90/010,663, please refer to the USPTO's public Patent Application Information Retrieval (PAIR) system under the Display References tab.

*Primary Examiner* — William H. Wood

(57) ABSTRACT

An interactive communication system is proposed for communicating software of video games or karaoke music from a host facility or distributor to end users. The system includes a communication terminal device provided at the end user. The communication terminal device includes a computer and a device for performing interactive communication with the host facility. The communication terminal device also includes temporary storage device in which video game data or karaoke data received from the host facility is temporarily stored. Game data stored in the temporary storage device is automatically deleted after a predetermined time period. Instead of the data deletion, the system can block the view displayed on the screen of the terminal device when a predetermined time has elapsed. The game data can be transmitted from broadcasting station to the terminal device via broadcasting wave.

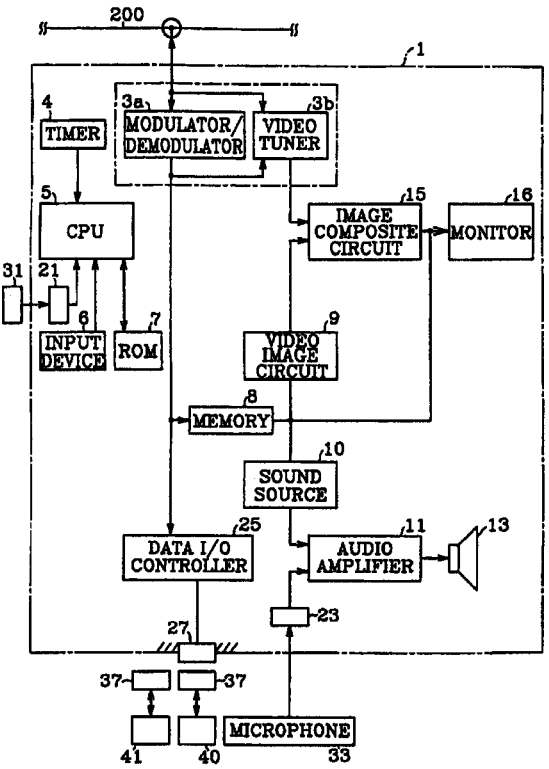
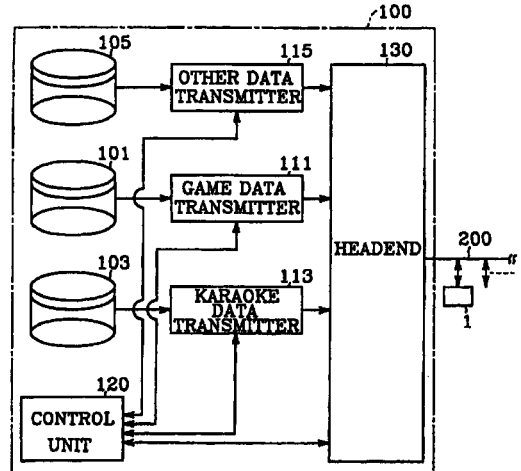

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-2 is confirmed.

New claims 4-13 and 14 are added and determined to be patentable.

Claim 3 was not reexamined.

4. *The communication system according to claim 1, wherein the receiving means is configured for reception via wireless transmission.*

5. *The communication system according to claim 1, wherein the communication terminal device is further configured to connect over telecommunication lines to at least another communication terminal device to facilitate interactive communication between the at least two communication terminal devices regarding the software program.*

6. *The communication system according to claim 5, wherein the interactive communication facilitated between the at least two communication terminal devices comprises real-time communication.*

7. *The communication system according to claim 1, wherein the software program comprises karaoke data.*

8. *The communication system according to claim 1, wherein the software program comprises a video game.*

9. *The communication system according to claim 1, wherein the software program comprises multimedia audio/video data.*

10. *The communication system according to claim 1, wherein the software program comprises karaoke data, a video game, or multimedia audio/video data.*

11. *The communication system according to claim 1, wherein the software program comprises either a video game, karaoke data, or multimedia audio/video data, and further wherein the predetermined time period comprises a rental period for the software program.*

12. *The communication system according to claim 11, still further wherein the interference means is configured to cease blocking the view on the screen in response to a payment of an additional charge.*

13. *The communication system according to claim 11, wherein the communication terminal device is further configured to connect over telecommunication lines to at least another communication terminal device to facilitate interactive communication between the at least two communication terminal devices regarding the software program.*

14. *The communication system according to claim 1, wherein the display means having a screen comprises a connection to an external monitor and speaker.*

\* \* \* \* \*